(12) United States Patent
Ratnayake (10) Patent No.: US 11,341,400 B1
(45) Date of Patent: May 24, 2022

(54) SYSTEMS AND METHODS FOR HIGH-THROUGHPUT COMPUTATIONS IN A DEEP NEURAL NETWORK

(71) Applicant: Marvell International Ltd., Hamilton (BM)

(72) Inventor: Ruwan Ratnayake, San Jose, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 938 days.

(21) Appl. No.: 16/117,991

(22) Filed: Aug. 30, 2018

Related U.S. Application Data (60) Provisional application No. 62/552,150, filed on Aug. 30, 2017.

(51) Int. Cl.
*G06N 3/063* (2006.01)
*G06F 17/16* (2006.01)
*G06N 3/04* (2006.01)

(52) U.S. Cl.
CPC ............. *G06N 3/063* (2013.01); *G06F 17/16* (2013.01); *G06N 3/0481* (2013.01)

(58) Field of Classification Search
CPC ....... G06N 3/063; G06N 3/0481; G06F 17/16
USPC ......................................................... 706/33
See application file for complete search history.

(56) References Cited

U.S. PATENT DOCUMENTS 10,558,575 B2 * 2/2020 Fleming, Jr. ........ G06F 15/8023
2016/0307095 A1 * 10/2016 Li ............................ G06N 3/02
2019/0303743 A1 * 10/2019 Venkataramani ..... G06F 9/3004

OTHER PUBLICATIONS

Kim, et al., "A SIMD Neural Network Processor for Image Processing", Advances in Neural Networks—ISNN 2005, pp. 665-672 (Year: 2005).*

* cited by examiner

*Primary Examiner* — Tsu-Chang Lee (57) ABSTRACT

This disclosure describes methods and systems for high-throughput computations in a fully-connected deep neural network. Specifically, a hardware-based deep neural network architecture including a set of parallel node processors is used to process node value transition between layers of the deep neural network, which usually involves a large-scale matrix multiplication. The set of parallel node processors are configured to decompose the large-scale matrix multiplication into sub-matrix multiplications with smaller sizes and thus reducing the hardware-complexity and making feasible direct implementation in hardware. With this implementation deep neural network may achieve a very high throughput and can handle a large number of processing layers.

20 Claims, 7 Drawing Sheets

SYSTEMS AND METHODS FOR HIGH-THROUGHPUT COMPUTATIONS IN A DEEP NEURAL NETWORK

CROSS-REFERENCE TO RELATED APPLICATION

This disclosure claims the benefit under 35 U.S.C. § 119(e) of U.S. Provisional Patent Application No. 62/552,150, filed Aug. 30, 2017, which is hereby incorporated by reference herein in its entirety.

FIELD OF USE

This disclosure relates to neural network architectures, and specifically, to systems and methods for high-throughput computations in a deep neural network.

BACKGROUND OF THE DISCLOSURES

Artificial neural networks are computing systems including interconnected processors, i.e., artificial neurons, operated in a way that imitate a biological neural network that constitute animal brains. A deep neural network (DNN) is an artificial neural network with multiple layers between an input layer and an output layer. Specifically, the deep neural network is configured to find a mathematical relationship to turn the input into the output. Each mathematical relationship can be formed as a layer, and the deep neural network can have many layers to turn input data through a series of mathematical manipulations to generate output data.

When the fully-connected deep neural network is operated with a large array of input data, or a large number of layers, the computational complexity of the deep neural network may increase dramatically. Current neural networks are predominantly implemented through software and runs on a CPU or a GPU. Although this software implementation may provide some flexibility to the developer, the resulting deep neural network may have limited data throughput. Alternatively, some neural networks can be implemented directly in hardware in a fixed-point architecture, which may improve the data throughput. However, the fixed-point architecture also causes a loss of resolution that leads to reduced accuracy in the output data of the deep neural network.

SUMMARY

Embodiments described herein provide a system for high throughput fully-connected deep neural network processing. The system includes a first memory configured to store a first vector of node values corresponding to a current layer of a deep neural network, in which the first vector of node values is divided into a number of sub-vectors, and a second memory configured to store a second vector of node values corresponding to a next layer subsequent to the current layer. The system further includes a plurality of node processors operated in parallel. Each node processor, at a first cycle, is configured to: read a first sub-vector of node values from the first memory, obtain a first corresponding set of weights corresponding to the current layer, compute a multiplication of the first sub-vector of node values and the first corresponding set of weights to obtain a first multiplication result, and update an accumulated output value from a previous clock cycle by adding the first multiplication result.

In some implementations, the first memory and the second memory are disposed on a same circuit with the plurality of node processors such that the plurality of node processors read and write intermediate data values during fully-connected deep neural network processing without accessing an external memory. The first memory is configured to store the first vector of node values as a number of sub-vectors of equal lengths (e.g., M), and each respective node processor is configured to consecutively read each sub-vector of node values from the first memory in consecutive cycles.

In some implementations, the system further includes a third memory configured to store a set of weights representing a transformation matrix from the current layer to the next layer. The transformation matrix is stored as a plurality of sub-matrices having a same size corresponding to a length of the first sub-vector in each dimension (i.e. M×M), and the first corresponding set of weights corresponds to a first row from a first sub-matrix from the plurality of sub-matrices.

In some implementations, the plurality of node processors includes a number of node processors equivalent to a length of the first sub-vector. At the first cycle, a first node processor is configured to multiply the first row from the first sub-matrix with the first sub-vector of node values, and a second node processor operated in parallel to the first node processor is configured to obtain, from the third memory, a second corresponding set of weights corresponding to a second row of the first sub-matrix and multiply the second row with the first sub-vector of node values.

In some implementations, each node processor is configured, at a second cycle subsequent to the first cycle, to: read a second sub-vector of node values from the first memory, obtain a second corresponding set of weights corresponding to a first row of a second sub-matrix from the plurality of sub-matrices, wherein the second sub-matrix belongs to a same row of sub-matrices with the first sub-matrix, multiply the second corresponding set of weights with the second sub-vector of node values to obtain a second multiplication result and add the second multiplication result to the updated accumulated output value.

In some implementations, each node processor comprises a look-up-table element configured to apply an array of non-linear activation function to the updated accumulated output value. Each node processor is configured, after a number of cycles equivalent to a value obtained a total length of the vector of node values divided by a length of the first sub-vector, to apply, via the look-up-table element, an activation function to the updated accumulated output value from a current cycle; and write a result value from the activation function to the second memory at a memory address corresponding to a first node in the next layer.

In some implementations, each node processor is configured, after the number of cycles, to obtain a second corresponding set of weights corresponding to a first row in a second sub-matrix from the plurality of sub-matrices. The second sub-matrix belongs to a same column of sub-matrices with the first sub-matrix. The node processor is further configured to multiply the first sub-vector of node values and the second corresponding set of weights to obtain a second multiplication result. The second multiplication result is used to accumulate a value corresponding to a second node in the next layer.

In some implementations, the system further includes control logic configured to toggle an input and out structure of the first memory and the second memory, respectively. After the toggling, the plurality of node processors are configured to read the second vector of node values corresponding to the next layer from the second memory; and generate node values corresponding to another layer subsequent to the next layer. The first memory is configured to store the generated node values corresponding to the other layer subsequent to the next layer.

In some implementations, each node processor comprises a multiplier configured to apply a scaling factor to the accumulated output value when the first corresponding set of weights are pre-scaled to avoid data underflow or overflow.

In some implementations, each node processor is configured to make adjustment to a number of fractional bits of the updated accumulated output value such that the updated accumulated output value is converted to a different range prior to applying an activation function.

Embodiments described herein also provide a method for high throughput fully-connected deep neural network processing. The method includes storing, at a first memory, a first vector of node values corresponding to a current layer of a fully-connected deep neural network, wherein the first vector of node values is divided into a number of sub-vectors, and storing, at a second memory, a second vector of node values corresponding to a next layer subsequent to the current layer. The method further includes operating a plurality of node processors in parallel. The operation includes at a first cycle: reading, by each node processor, a first sub-vector of node values from the first memory, obtaining a first corresponding set of weights corresponding to the current layer, computing a multiplication of the first sub-vector of node values and the first corresponding set of weights to obtain a first multiplication result, and updating an accumulated output value from a previous clock cycle by adding the first multiplication result.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for high-throughput computations in a fully-connected deep neural network. Specifically, a hardware-based deep neural network architecture including a set of parallel node processors is used to process node value transition between layers of the fully-connected deep neural network, which usually involves a large-scale matrix multiplication. The set of parallel node processors are configured to decompose the large-scale matrix multiplication into sub-matrix multiplications with smaller sizes (e.g., M×M) and thus reducing the hardware-complexity and making feasible direct implementation in hardware. With this implementation fully-connected deep neural network may achieve a very high throughput and can handle a large number of processing layers. Such deep neural network architecture may be used in various applications, such as auto-encoders/detectors in digital signal processing, computer vision, automotive, deep learning classification etc., to handle a large set of input data samples or a complicated deep neural network.

Figure 1:
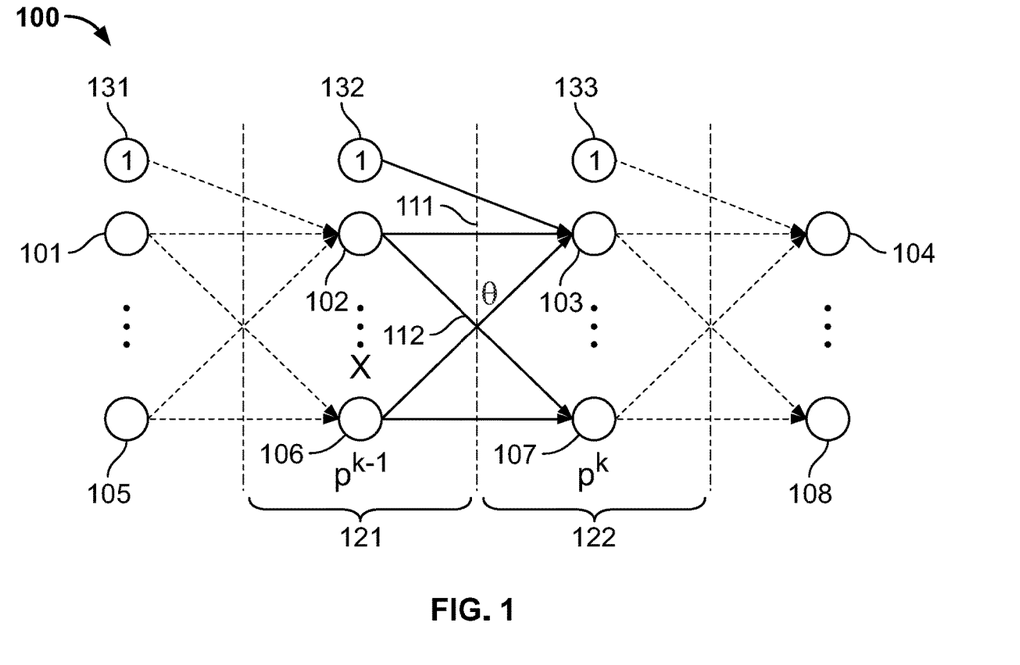
FIG. 1 shows an example block diagram illustrating a fully-connected deep neural network having an interconnected group of nodes, according to embodiments described herein.

For example, as shown in FIG. 1, a fully-connected deep neural network usually includes an interconnected group of nodes, e.g., 101-108, akin to the vast network of neurons in a biological brain. Each node, e.g., 102, is connected to an arrow, e.g., 111, representing a connection from the output of one node (102) to the input of another (103). Each connection 111-112 usually corresponds to a weight to be applied to the input data of the respective layer. The nodes are usually aggregated into layers, e.g., 121-122, and each layer is configured to perform a different kind of transformation (also referred to as the activation function) on the respective input to the layer. Data signals may travel from the first layer (e.g., the input layer) of the deep neural network to the last layer (e.g., the output layer) of the deep neural network, after traversing layers between the input layer and the output layer. In some embodiments, the layers between the input and output layers are also referred to as "hidden layers."

Figure 2:
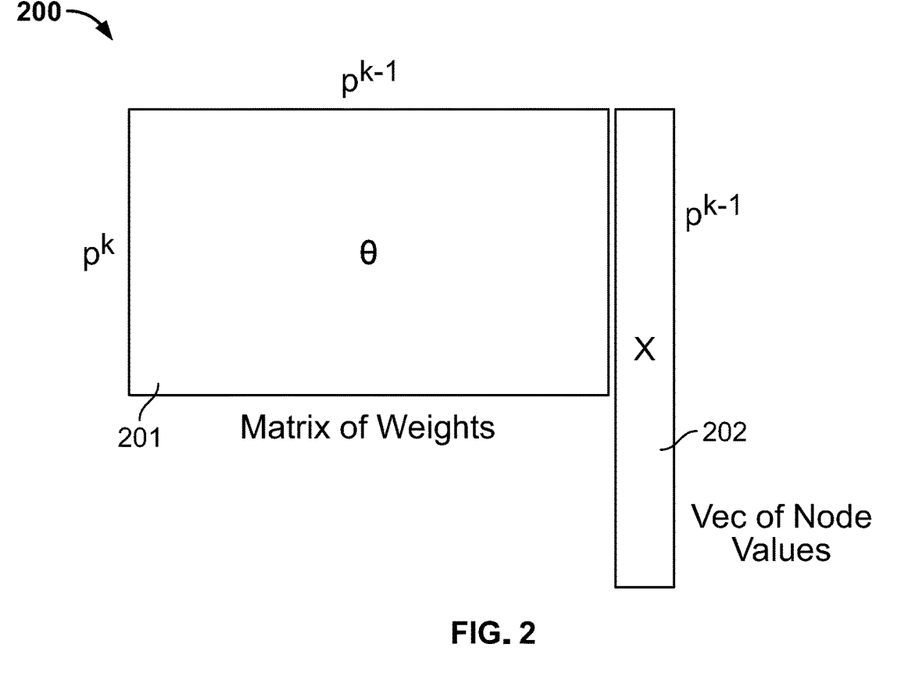
FIG. 2 shows an example block diagram illustrating a matrix multiplication representing transition between layers in the fully-connected deep neural network illustrated in FIG. 1, according to embodiments described herein.

At each layer (e.g., 121-122), a bias term 131-133 is sometimes applied to control the output data. As shown in FIG. 2, if there are a number $p^{k-1}$ of nodes at the (k−1)th layer 121, and a number $p^k$ of nodes at the kth layer 122, the transformation at the (k−1)th layer can be described by a matrix multiplication shown at 200. For example, if θ (e.g., 201) represents a $p^k \times p^{k-1}$ matrix of weights, X (e.g., 202) represents the vector of $p^{k-1}$ node values in the (k−1)th layer, the node values at the kth layer is computed by θ×X. Thus, when the fully-connected deep neural network (e.g., 100) contains a large number of nodes, rendering a large matrix θ, the computation complexity of the matrix multiplication θ×X increases exponentially.

Figure 3:
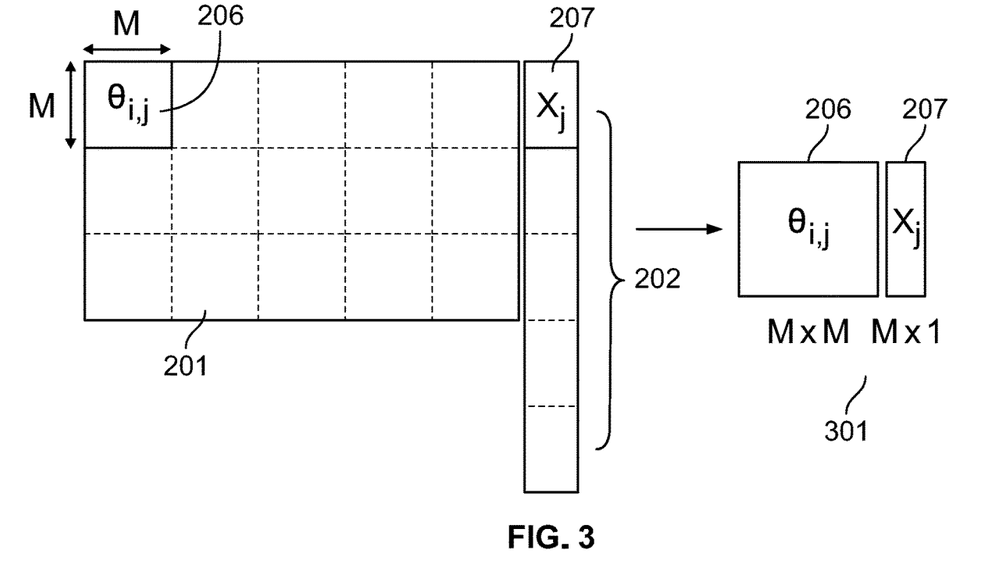
FIG. 3 shows an example block diagram illustrating dividing the matrix multiplication illustrated in FIG. 2 into sub-matrix multiplication with reduced complexity, according to embodiments described herein.

Embodiments described herein provide a hardware-based architecture to divide a large-scale matrix of weights θ into smaller sub-matrices to process the matrix multiplication at 200 via aggregating sub-matrix multiplication at reduced complexity. For example, as shown in FIG. 3, control logic operating the deep neural network may be configured to divide the matrix θ (e.g., 201) into smaller sub-matrices $\theta_{i,j}$ (e.g., 206) having a size of M×M, which corresponds to an M×1 vector $X_j$ (e.g., 207) in the vector X 202. The size of the sub-matrix M indicates the computation complexity of matrix multiplication, as the matrix multiplication 200 shown in FIG. 2 is reduced to calculating the multiplication 301 between the sub-matrix $\theta_{i,j}$ and $X_j$.

In some implementations, when the size of the matrix θ (e.g., $p^k$ or $p^{k-1}$) is not multiples of M, matrix θ may be extended with extra zero padding to form an extended size such that the extended matrix has a size of multiples of M.

Figure 4:
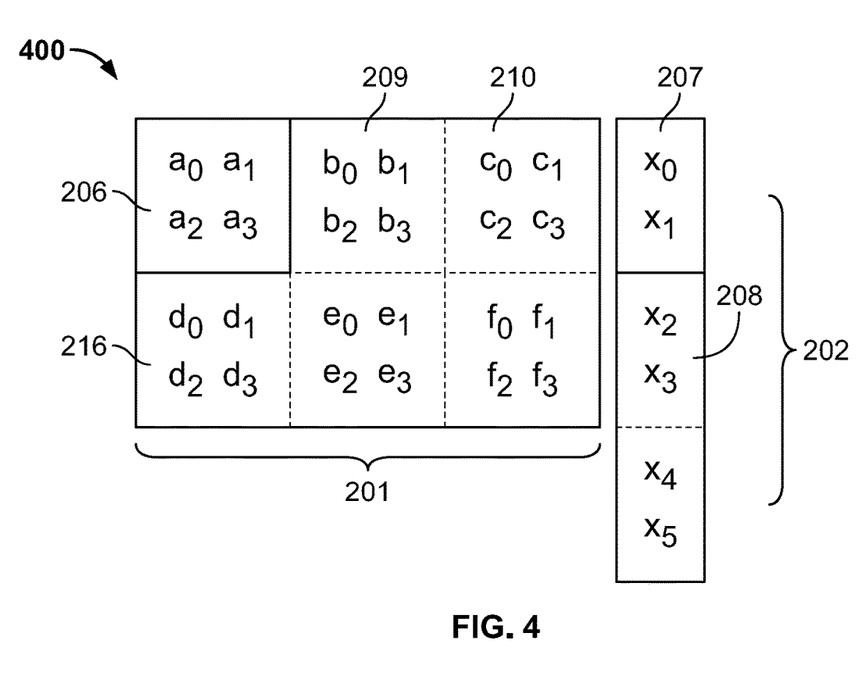
FIG. 4 shows an example illustrating sub-matrix multiplication shown in FIG. 3, according to embodiments described herein.

For example, to perform multiplication 200 by aggregating "sub-multiplications" 301, at each clock cycle, one sub-matrix (e.g., 206) is processed. A number of M nodes values (e.g., node values in the M×1 vector $X_j$) and a number of $M^2$ values from the θ matrix (e.g., entries in the sub-matrix $\theta_{i,j}$) is read from a memory. Matrix multiplication such as 301 at a complexity of $M^2$ is performed, and the results for all such "sub-multiplications" 301 are aggregated. Specifically, after a row of sub-matrices is processed, the node values for the next layer (e.g., output from the current layer) is computed as:

$$X'_i = \sum_{j=1}^{p^{k-1}} \theta_{i,j} X_j$$

wherein, i and j represent the row and column index of the sub-matrix, respectively and $P^{k-1}=\text{ceil}(p^{k-1}/M)$ i.e. the num of sub-matrixes in row i FIG. 4 provides an example illustrating the matrix multiplication via aggregating multiplications through divided sub-matrices, according to embodiments described herein. In the example shown at 400, the matrix θ has a size of 4×6, which is divided into sub-matrices (e.g., 206) having a size of 2×2 (i.e M=2). The corresponding sub-vector $(x_0, x_1)^T$ 207 has a size of 2×1.

At a first clock cycle, control logic of the deep neural network reads the node values $x_0$, $x_1$ from sub-vector 207, and entries $a_0$, $a_1$, $a_2$, $a_3$ from sub-matrix 206. The sub-vector 207 is then multiplied with the sub-matrix 206 to generate a first accumulator $a_0x_0+a_1x_1$ and a second accumulator $a_2x_0+a_3x_1$, which are fed to the next cycle for accumulation.

At a second clock cycle subsequent to the first clock cycle, control logic of the deep neural network reads the node values $x_2$, $x_3$ from sub-vector 208, and entries $b_0$, $b_1$, $b_2$, $b_3$ from sub-matrix 209. The sub-vector 208 is then multiplied with the sub-matrix 209 to generate a first accumulator $b_0x_2+b_1x_3$ and a second accumulator $b_2x_3+b_3x_4$, which are in turn added to the accumulators from the first clock cycle to render a first accumulator $b_0x_2+b_1x_3+(a_2x_0+a_3x_1)$ and a second accumulator $b_2x_3+b_3x_4+(a_2x_0+a_3x_1)$. The computed accumulators are then fed to the next cycle for accumulation.

Similar process may be repeated to accumulate the products between sub-matrices and sub-vectors until an entire row of sub-matrices, e.g., 206, 209 and 210 have been accounted for in the multiplication. After the entire row of sub-matrices have been processed, the resulting first accumulator and the second accumulator are applied to the activation function to transform the resulting values to the corresponding node values for the next layer, which is written to the memory of the corresponding nodes in the fully-connected deep neural network. The computation process may be illustrated in the following table.

TABLE 1

Example Computation of Matrix Multiplication via Divided Sub-Matrices

| cycle | First accumulator | Second accumulator |
|---|---|---|
| 1 | a0 × 0 + a1 × 1 | a2 × 0 + a3 × 1 |
| 2 | b0 × 2 + b1 × 3 + (a0 × 0 + a1 × 1) | b2 × 2 + b3 × 3 + (a2 × 0 + a3 × 1) |
| 3 | c0 × 4 + c1 × 5 + (b0 × 2 + b1 × 3 + a0 × 0 + a1 × 1) | c2 × 4 + c3 × 5 + (b2 × 2 + b3 × 3 + a2 × 0 + a3 × 1) |
| | Activation function -> write to node mem | |
| 4 | d0 × 0 + d1 × 1 | d2 × 0 + d3 × 1 |
| ... | ... | ... |

Figure 5:
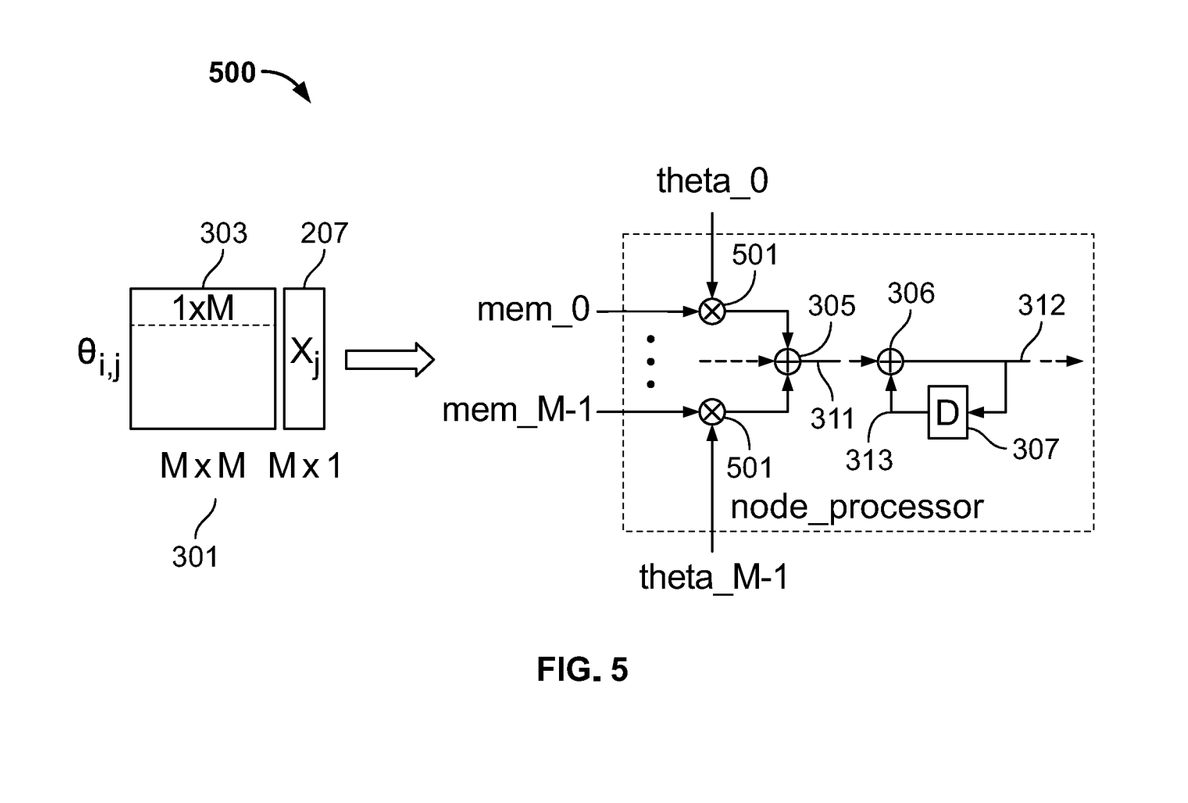
FIG. 5 provides an example diagram illustrating an example structure of a node processor corresponding to a row in a sub-matrix in processing the matrix multiplication, according to embodiments described herein.

FIG. 5 provides an example diagram illustrating an example structure of a node processor corresponding to a row in a sub-matrix in processing the matrix multiplication, according to embodiments described herein. The multiplication between a sub-matrix and a corresponding sub-vector, e.g., shown at 301 in FIG. 3, may be implemented at plurality of node processors each having a structure similar to 500. For example, each row (e.g., 303) having a size of 1×M of the sub-matrix corresponds to a node processor 500, which includes M multipliers (e.g., 501). Each of the multipliers 501 is configured to multiply an entry from the row 303 and an entry from the sub-vector 207, and an adder 305 is configured to aggregate all products from the M multipliers. The node processor 500 further includes an accumulation element connected to the aggregation output from the adder 305, which includes an adder 306 and a register 307 such that the aggregation output from the adder 305 is accumulated across adjacent clock cycles. For example, the output 312 of the node processor 500 at a current cycle equals the sum of the aggregation of all multiplication results, e.g., 311, plus the output of the node processor 500 from the previous cycle, e.g., 313.

Figure 6:
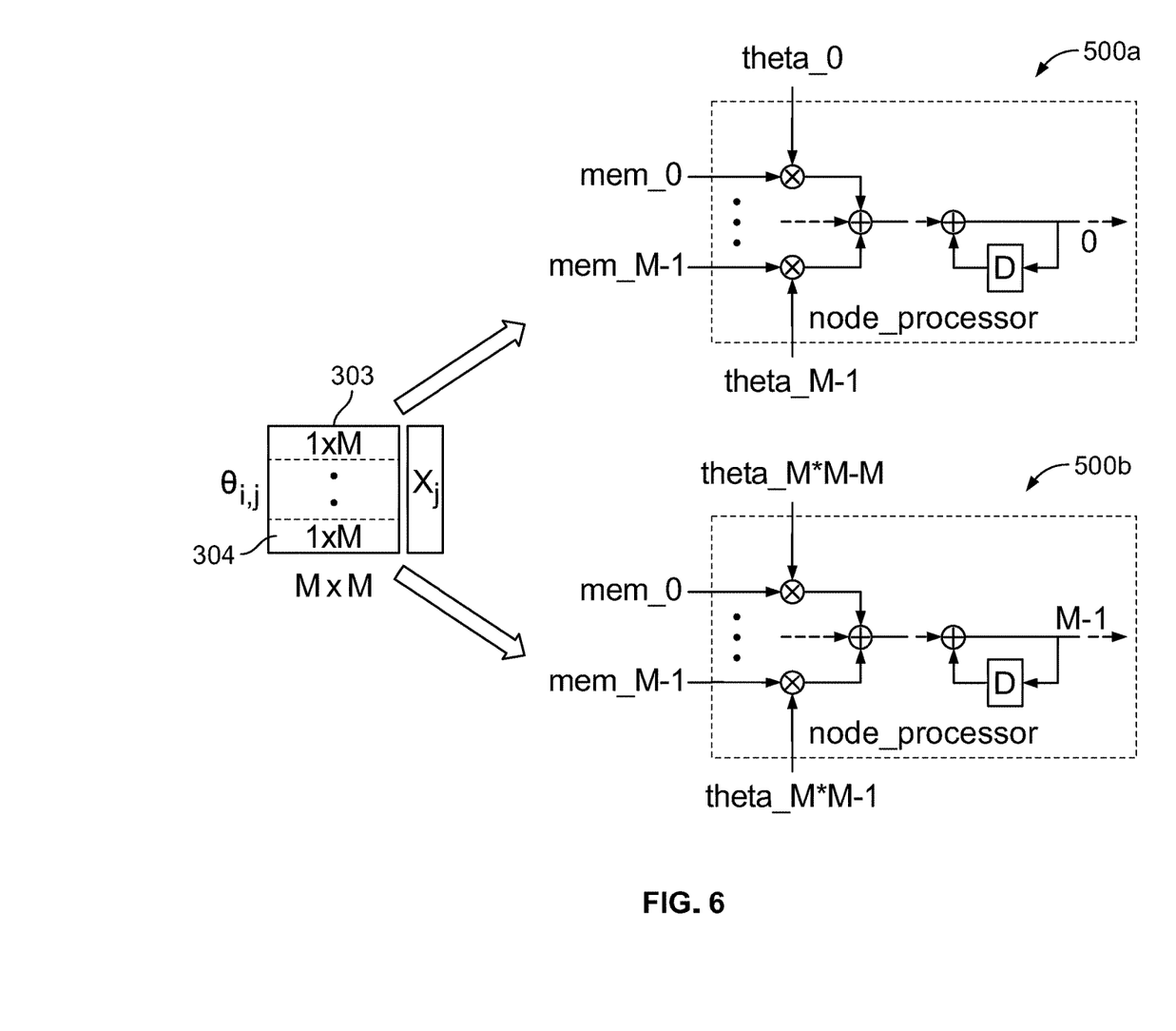
FIG. 6 provides an example structure illustrating multiple parallel node processors corresponding to different rows of a sub-matrix to process matrix multiplication, according to embodiments described herein.

FIG. 6 provides an example structure illustrating multiple parallel node processors corresponding to different rows of a sub-matrix to process matrix multiplication, according to embodiments described herein. Each row (e.g., 303, 304, etc.) in the sub-matrix $\theta_{i,j}$ corresponds to a node processor 500a or 500b, respectively, and the node processors 500a-b are disposed in parallel. Each of the node processors 500a-b is the same as the node processor shown in FIG. 5. For the M×M sub-matrix $\theta_{i,j}$, a number of M node processors are used to compute an aggregated sum as described in FIG. 5 at one clock cycle. Each of the M node processors is configured to generate a respective output for a respective node in the next layer.

Figure 7:
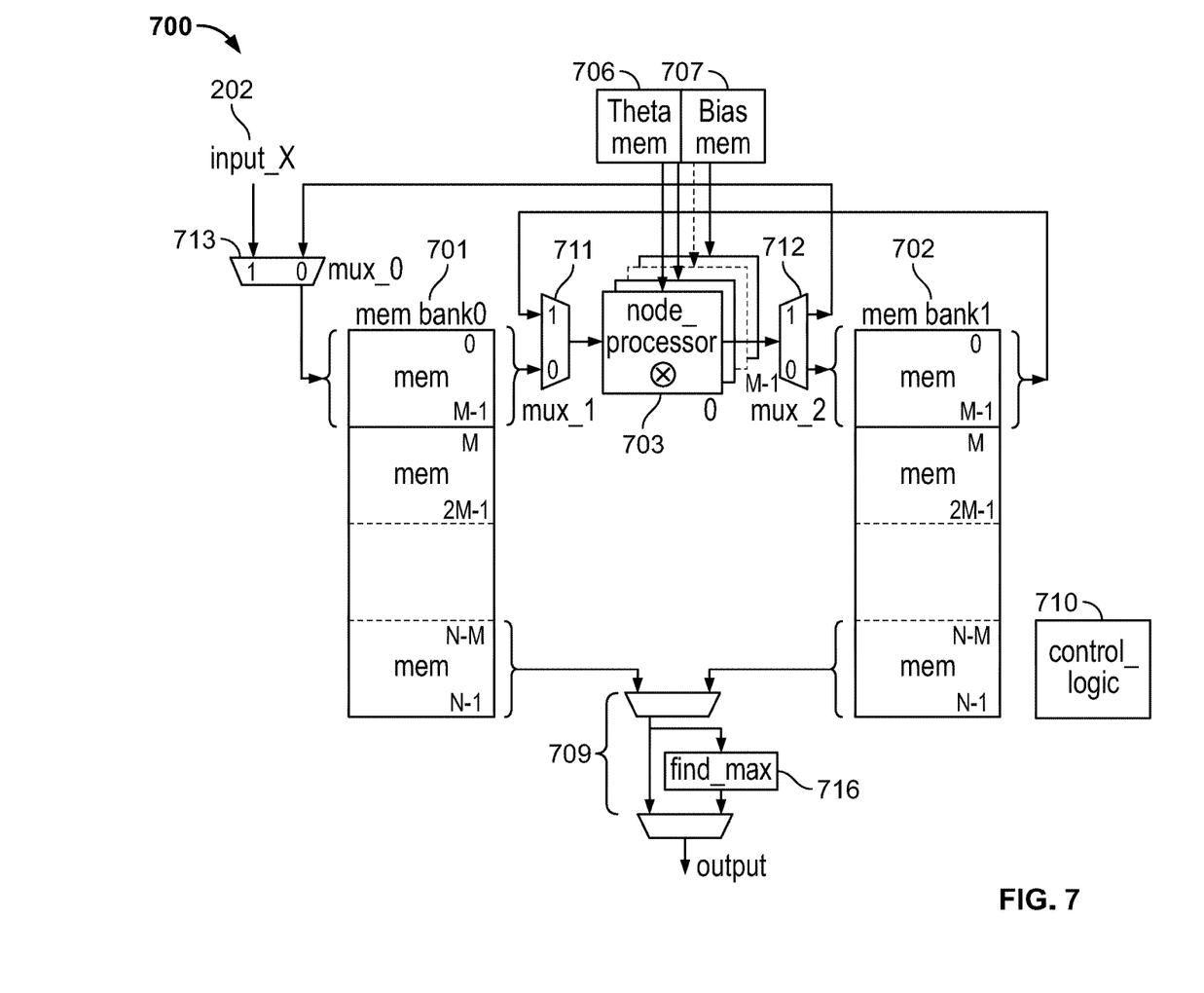
FIG. 7 provides an example structure illustrating n overall architecture for computing the matrix multiplication in FIG. 2 via the parallel node processors shown in FIG. 6, according to one embodiment described herein.

FIG. 7 provides an example structure illustrating n overall architecture 700 for computing the matrix multiplication in FIG. 2 via the parallel node processors shown in FIG. 6, according to one embodiment described herein. Architecture 700 includes two sets of memory banks 701 and 702, each of which includes N (the maximum number of nodes of each layer) memory elements. Memory bank 701 is configured to store node values of the current layer, and is divided into memory blocks (or memory words), each having a size of M and corresponding to a respective sub-vector (e.g., $X_j$ 207). Memory bank 702 is configured to store node values of the next layer, and is divided into memory blocks, each having a size of M and corresponding to a respective sub-vector (e.g., $X_i'$ computed from the multiplication at 200).

Architecture 700 further includes a bank of M parallel node-processors 703. Each node processor in the M parallel node-processors 703 is the same as the node processor shown in FIG. 5, or 500a-b in FIG. 6. The M parallel node-processors 703 are disposed as further illustrated in FIG. 8, each of which corresponds to a row in a sub-matrix and is configured to compute the corresponding node value in the next layer. Architecture 700 further includes peripheral components, such as a memory 706 to store the weights (e.g., the θ matrix 201) for each layer, a memory 707 to store the bias term (e.g., 132) for each layer, a final output processing unit 709 and control logic 710 to control the overall operation of architecture 700. The control logic is programmed (based on value of M) to control the required reading, writing of memories, enabling processing at node-processors etc. at appropriate cycles.

Architecture 700 may be initialized by storing the external input values (image etc.) in memory bank 701 (input multiplexer 713 is set to 1) and storing the weight sub-matrices $\theta_{i,j}$ for all i,j values corresponding to each layer in memory 706. After writing the external input samples, the input multiplexer 713 is set to 0, while multiplexers 711 and 712 are set to a logical value of 0.

At a first clock cycle, each of the M node processors 703 is configured to first read 0 to M−1 current node values from memory bank 701. Each node processor is also configured to read the respective weight values corresponding to a row in a sub-matrix $\theta_{i,j}$ that the respective node processor represents from the memory 706, and then configured to, during the same first clock cycle, multiply the node values with the corresponding θ weights, e.g., as described in FIG. 5. The first node processor is then configured to retain the intermediate results within a node processing unit, as further described in FIG. 8. In the next clock cycle, each of the M node processors 703 is configured to read node values M to 2M−1 from memory bank 701 and then process the M to 2M−1 node values in a similar way. The node processors 703 may repeat the process for ($p^{k-1}$/M) cycles until all node values in the memory bank 701 have been processed, wherein $p^{k-1}$ ($p^{k-1}$≤N) represents the number of nodes in the current k-lth layer, and M is the size of the sub-matrix (and also the number of parallel node processors 703). It is noted that throughout the disclosure, if $p^{k-1}$/M (or $p^k$/M) is not an integer, a ceiling operation ceil($p^{k-1}$/M) (or ceil($p^k$/M)) can be performed to obtain the minimum integer value that is greater than $p^{k-1}$/M (or $p^k$/M).

As the architecture 700 contains M node processors 703 running in parallel, the architecture 700 is able to process values for M output nodes at each cycle. Thus after the first ($p^{k-1}$/M) cycles, node values for output nodes 0 to M−1 can be obtained. The resulting new node vales are then written into memory bank 702 (e.g., the first 0 to M−1 entries). The node processors may then repeat the same process for another ($p^{k-1}$/M) cycles to generate output values for nodes M to 2M−1 which are stored in the corresponding memory elements in memory bank 702. Thus, after ($p^k$/M)×($p^{k-1}$/M) cycles, the node processors 703 may complete generating all the node values for the next layer and store the generated node values at memory bank 702.

The architecture 700 may also be used to process layer transitions across multiple layers, e.g., when there are one or more hidden layers between the input layer and output layer of the deep neural network. For example, after the node values for the next layer (e.g., a first hidden layer) have been generated and stored at the memory bank 702, architecture 700 may be configured to process the output nodes values stored at the memory bank 702 for a second hidden layer. Control logic 710 is configured to set the multiplexers 711 and 712 to have a logical value of 1 in order to toggle the read and write tasks between the two memory banks 701 and 702, e.g., the node processors 703 are configured to read from memory bank 702 and write into memory bank 701. Thus, the same procedure described above can be repeated by the node processors 703 to generate the node values for the second hidden layer (subsequent to the first hidden layer) from the node values stored at memory bank 702. Toggling between the two memory banks, the architecture 700 may generate the node values for the next layer based on the node vales of the current layer. The process may continue until node values for the last layer (output layer) are generated. For some fully-connected deep neural networks, the control logic 710 may toggle the input and output structure (e.g., multiplexers 711 and 712) between the memory banks 701 and 702 a number of times, based on the number of hidden layers between the input layer and the output layer of the deep neural network.

After the node values for the last layer are generated, the outputs can be computed by reading from the corresponding memory bank, depending on which memory bank 701 or 702 is performing the write task during the corresponding cycle. If the deep neural network is configured to perform detection or classification that requires a hard output, then the output can be generated via finding the output node index/classifier with the maximum value at 716. The find max unit 716 may include logics to find the maximum from a vector of inputs. On the other hand, if the output requires soft outputs (e.g. probabilities of a value), the output unit 709 may be configured to read the relevant nodes of the last layer to generate the output values.

With the M parallel node processors 703, architecture 700 may achieve improved data throughput. For example, to perform the matrix multiplication 200 in FIG. 2, the number of cycles required is equal to ceil($p^{k-1}$/M)×ceil($p^k$/M)+Δ, wherein Δ represents the pipeline delays along the node processors. For example, the matrix multiplication 400 as shown in FIG. 4 takes 6 clock cycles (plus pipeline delay) to process. For a neural network consisting of an input layer, an output layer and L hidden layers, the total number of cycles taken to process all layers is calculated as $$\sum_{k=1}^{L+1} ceil(p^k/M)ceil(p^{k-1}/M) + (L+1)\Delta.$$

Thus, the fully-connected deep neural network layer processing may be implemented with reduced complexity as compared to matrix multiplication complexity at the level of O ($p^{2k-1}$). In addition, within the parallel node processors 703, computations can be done within each cycle, unlike most existing systems in which multiple cycles are needed to perform a computation task with additional read/write operation overhead.

The fully-connected deep neural network architecture 700 may be used in various applications, such as auto-encoders/detectors in digital signal processing, computer vision, automotive, deep learning classification etc. With reduced complexity, the fully-connected deep neural network architecture may achieve a high throughput system that handles a large scale of input data vector and a large number of processing layers.

In addition, architecture 700 provides a direct implementation of deep neural networks at a hardware level, as opposed to many existing software based fully-connected deep neural networks. Specifically, as shown at 700, all intermediate values (e.g., node values at a hidden layer, etc.)

are stored locally (e.g., at memory bank 701 or 702), no repeated data access is required from any outside memory such as an off-chip DRAM, which saves circuit power needed for external memory access. Thus, each clock cycle is used to perform computations such as a sum of products and no additional wait cycles for data transfer is necessary. In this way, for a given number of multiplier-accumulator units (e.g., 501, 305, 306), architecture 700 requires the least number of clock cycles to process a fully connected deep neural network, compared to other hardware/software configurations, because architecture 700 requires no redundant cycles.

Figure 8:
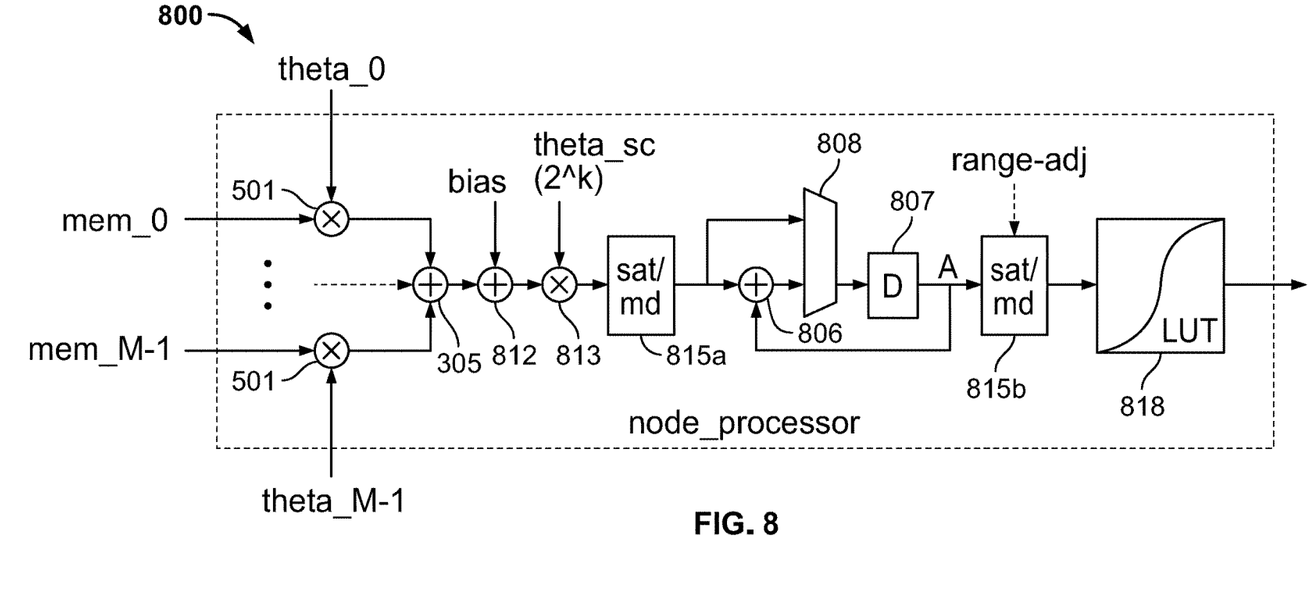
FIG. 8 provides an example structure illustrating each node processor in the parallel node processor bank in FIG. 7, according to one embodiment described herein.

FIG. 8 provides an example structure illustrating details of each node processor in the parallel node processor bank 703 in FIG. 7, according to one embodiment described herein. The node processor shown at 800 performs the same function as the node processor 500 in FIGS. 5 and 500a-b in FIGS. 6 (500 and 500a-b can be viewed as a simplified version of 800). The node processor 800 has a plurality of multipliers 501 configured to multiply the node values with the corresponding θ weights and an adder 305 to aggregate the multiplication results. Node processor 800 further includes an adder 812 to add the bias term (e.g., 132 in FIG. 1).

A theta_sc parameter is applied at the multiplier 813 for scaling purpose. Specifically, if the θ weights are either too small or too large for fixed-point implementation, then the resulting summation at adder 305 may either underflow or overflow, respectively. The θ weights may then be scaled appropriately before being fed to the multipliers 501. Thus, the adder result from adder 305 can be re-scaled to eliminate the effect of scaling the θ weights. For example, at multiplier 813, a scaling value that is constrained to $2^k$ is applied by shifting data bits K times. In this way, the scaling and re-scaling process may improve the accuracy of fixed-point implementation.

The node processor 800 further includes a saturation/rounding element 815a to round the data output from the multiplier 813, and send the rounded data output to accumulator 806,807 (or 306,307). For example, this accumulator accumulates sum of products across adjacent clock cycles. The multiplexer 808 simplifies the resetting of the accumulator without requiring additional cycles. The output value from the register 807 (or 307) is then again rounded at the saturation/rounding element 815b, and then passed to a look-up-table (LUT) element 818.

The LUT element 818 can be configured to implement an array of standard non-linear activation functions that is used in neural networks, including but not limited to Sigmoid function, hyperbolic function Tanh, Rectified Linear unit (ReLU), and/or the like. Given the non-linearity of the function implemented by LUT 818, non-uniform quantization may be employed in order to obtain the fixed-point implementation with reduced quantization error. When the activation function at the layer is either symmetrical or non-zero only for half of the input range, the LUT depth can be reduce by half.

In some implementations, LUT efficiency may be improved by reducing the LUT size while preserving the output resolution. Specifically, appropriate adjustments may be made to the LUT input, e.g., by applying range adjustment at the saturation/rounding element 815b. At times, the output of the running summation at point 'A' may have a high bit-width and thus a high resolution. Range adjustment applied at the saturation/rounding element 815b can adjust the appropriate number of fractional bits of the data value that is fed into the LUT. In this way, the loss of accuracy may be alleviated in fixed-point implementation.

Figure 9:
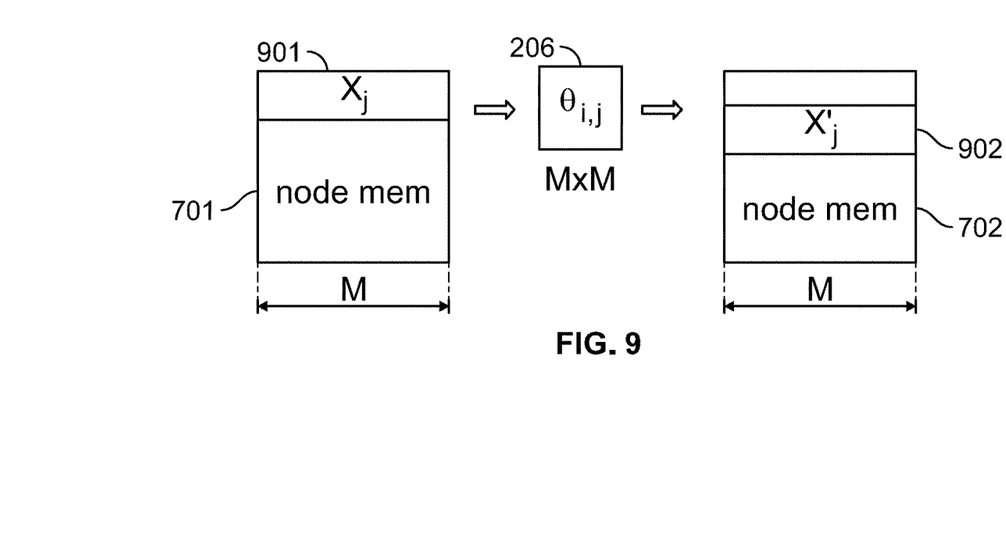
FIG. 9 provides a diagram illustrating the required node-memory formats corresponding to the sub-matrix format M×M, according to some embodiments described herein.

FIG. 9 provides a diagram illustrating the required node-memory formats corresponding to the sub-matrix format, according to an embodiment described herein. For example, for a sub-matrix 206 having a size of M×M, the required node-memory width at memory bank 701 is M for the 1×M input vector $X_j$ 901. Similarly, the required node-memory width at memory bank 702 is M for the 1×M output vector $X_j'$ 902.

Figure 10:
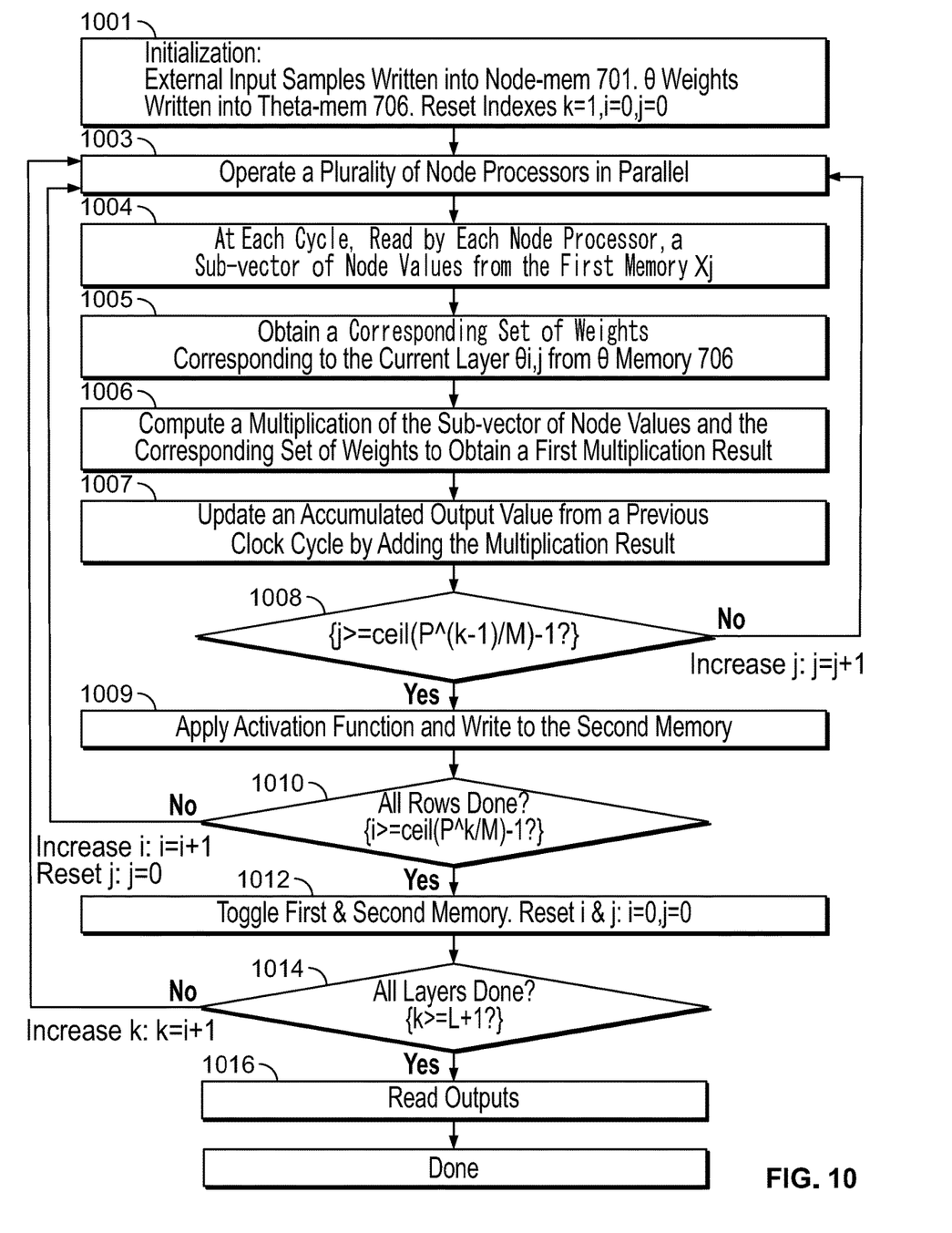
FIG. 10 provides an example data flow diagram illustrating a work flow for calculating matrix multiplication via the architecture shown in FIG. 7, according to embodiments described herein.

FIG. 10 provides an example data flow diagram illustrating a work flow for layer processing via the architecture shown in FIG. 7, according to embodiments described herein. At initialization 1001, external input samples (e.g., 202 in FIG. 7), e.g., in the form of a $p^{k-1} \times 1$ vector X, are written into a first memory (e.g., memory bank 701). The data samples are written in the form of a plurality of memory words such as each memory word contains M samples (e.g., the memory width M as shown at 701 in FIG. 9). The θ values (e.g., 201 in FIG. 2) for all the sub-matrices in each layer are written into memory bank 706. Each θ memory word will contain $M^2$ weight values corresponding to an M×M sub-matrix $θ_{i,j}$ that can be read in one cycle. The layer index k indicating the layer (e.g., 121, 122, etc.) in the deep neural network, row index i in the θ matrix 201, and column index j in the θ matrix 201, are reset to be 1,0,0 respectively. In the example shown in FIG. 4, when M=2, the vector ($x_0$, $x_1$, $x_2$, $x_3$, $x_4$, $x_5$) is divided into sub-vectors ($x_0$, $x_1$), ($x_2$, $x_3$), and ($x_4$, $x_5$). The sub-vector ($x_0$, $x_1$) is written into memory as a first memory word and the sub-vector ($x_2$, $x_3$) is written as the second memory word in memory bank 701, and/or the like. Weights for the first sub-matrix ($a_0$,$a_1$; $a_2$,$a_3$) are written as a first word in memory 706. Weights for the second sub-matrix ($b_0$,$b_1$; $b_2$,$b_3$) are written as a second memory word in memory 706.

At 1003, the plurality of node processors 703 are operated in parallel. Specifically, at 1004, at each cycle, each node processor reads a first sub-vector $X_j$ of node values from the first memory (memory bank 701). In the example shown in FIG. 4, a first node processor and a second node processor (two node processors corresponding to the size 2×2 for the sub-matrix 206) reads the sub-vector ($x_0$, $x_1$) from the memory bank 701.

At 1005, a corresponding set of weights $θ_{i,j}$ corresponding to the current layer is obtained from a third memory (e.g., memory bank 706). In the above example from FIG. 4, the first node processor reads weights corresponding to a first row of sub-matrix 206, i.e., ($a_0$, $a_1$) and the second node processor reads weights corresponding to a second row of sub-matrix 206, i.e., ($a_2$, $a_3$).

At 1006, a multiplication of the first sub-vector of node values and the first corresponding set of weights is computed to obtain a first multiplication result. In the above example from FIG. 4, the first node processor computes a multiplication result of $a_0x_0+a_1x_1$ and the second node processor computes a multiplication result of $a_2x_0+a_3x_1$.

At 1007, an accumulated output value from a previous clock cycle is updated by adding the first multiplication result. In the above example from FIG. 4, in the first cycle, when the accumulated output value from the previous clock cycle is zero, the first node processor accumulates a result of $a_0x_0+a_1x_1$ and the second node processor accumulates a result of $a_2x_0+a_3x_1$. In the subsequent clock cycle, the first and second node processors reads a second sub-vector from memory bank 701, e.g., ($x_2$, $x_3$) and reads weights from sub-matrix 209 that belongs to the same row with the sub-matrix 206. For example, the first node processor reads the first row from sub-matrix 209, i.e., ($b_0$, $b_1$) and the second node processor reads the second row from sub-matrix 209, i.e., ($b_2$, $b_3$). The first node processor then computes a multiplication result of $b_0x_2+b_1x_3$ and the second node processor computes a multiplication result of $b_2x_2+b_3x_3$. The computed multiplication results are added with the accumulated output values $a_0x_0+a_1x_1$ and $a_2x_0+a_3x_1$ from the first cycle to obtain an updated accumulated output values $b_0x_2+b_1x_3+(a_0x_0+a_1x_1)$ and $b_2x_2+b_3x_3+(a_2x_0+a_3x_1)$, respectively.

At 1008, control logic (e.g., 710) determines whether all sub-matrices in the same row (having the same row index i) have all been processed, e.g., whether the current column index j≥ceil ($p^{k-1}$/M)−1. If j<ceil ($p^{k-1}$/M)−1, indicating more sub-matrices in the same row are to be processed, the column index j is to be incremented by 1 and the process repeats from 1003. In the above example from FIG. 4, when weights from sub-matrices 206, 209 and 210 are all read by the first and second node processors to be multiplied with the corresponding sub-vectors, control logic determines that the row of sub-matrices have all been processed.

Otherwise, if j≥ceil ($p^{k-1}$/M)−1, when the row of sub-matrices has all been processed, the process proceeds to 1009, where an activation function is applied, e.g., via look-up-table element 818, to the updated accumulated values and the resulting values are then written to the second memory (e.g., memory bank 702). In the above example from FIG. 4, when the row of sub-matrices 206, 209 and 210 are all processed, the next layer node values in the form of a 2×1 sub-vector are written into memory 702.

At 1010, if there are more rows of sub-matrices in the θ matrix to be processed, e.g., i<ceil($p^k$/M)−1, the row index i is incremented by 1, and the column index j is reset to zero; and the process repeats at 1003. Otherwise, if all rows in the θ matrix have been processed, e.g., i≥ceil($p^k$/M)−1, the node memories 701 and 702 are then toggled at 1012. For example, memory bank 701 is to be served as an output memory, and memory bank 702 is to be served as an input memory as described in FIG. 7. The row and column indices i, j are reset to 0 as the current layer processing is completed.

At 1014, if there are more layers in the deep neural network to be processed, e.g., the layer index k<L+1 (L is the number of hidden layers in the deep neural network), the layer index k is incremented by 1 and the process repeats from 1003. Otherwise, if there are no more layers in the deep neural network to be processed, e.g., the layer index k≥L+1, the outputs can be read from the output memory bank (e.g., 701 or 702 depending on which memory bank is serving as the output memory) at 1016. At this point, processing of the deep neural network is completed.

Various embodiments discussed in conjunction with FIGS. 1-10 are performed by various electronic components of one or more electronic circuits, such as but not limited to an integrated circuit, application-specific integrated circuit (ASIC), DSP, and/or the like. Various components discussed throughout this disclosure such as, but not limited to memories (e.g., 701, 702, 706 and 707 in FIG. 7), node processors (e.g., 500 in FIG. 5, 500a-b in FIG. 6, 703 in FIG. 7), and/or the like, are configured to include a set of electronic circuit components, and communicatively operate on one or more electronic circuits. Each electronic circuit is configured to include any of, but not limited to logic gates, adders, multipliers, registers, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. In certain implementations, multitasking and parallel processing may be advantageous. Other variations are within the scope of the following claims.

What is claimed is:

1. A system for high throughput deep neural network processing, the system comprising:
    a first memory configured to store a first vector of node values corresponding to a current layer of a deep neural network, wherein the first vector of node values is divided into a number of sub-vectors;
    a second memory configured to store a second vector of node values corresponding to a next layer subsequent to the current layer;
    a plurality of node processors operated in parallel, wherein each node processor, at a first cycle, is configured to:
        read a first sub-vector of node values from the first memory,
        obtain a first corresponding set of weights corresponding to the current layer,
        compute a multiplication of (i) the first sub-vector of node values and (ii) the first corresponding set of weights to obtain a first multiplication result, and
        update an accumulated output value from a previous cycle by adding the first multiplication result to the accumulated output value.

2. The system of claim 1, wherein the first memory and the second memory are disposed on a same circuit with the plurality of node processors such that the plurality of node processors read and write intermediate data values during deep neural network processing without accessing an external memory, and
    wherein the first memory is configured to store the first vector of node values as a number of sub-vectors of equal lengths, and
    wherein the each respective node processor is configured to consecutively read each sub-vector of node values from the first memory in consecutive cycles.

3. The system of claim 1, further comprising:
    a third memory configured to store a set of weights representing a transformation matrix from the current layer to the next layer, wherein the transformation matrix is stored as a plurality of sub-matrices having a same size corresponding to a length of the first sub-vector in each dimension, and
wherein the first corresponding set of weights corresponds to a first row from a first sub-matrix from the plurality of sub-matrices.

4. The system of claim 3, wherein the plurality of node processors includes a number of node processors equivalent to a length of the first sub-vector, and wherein, at the first cycle:
a first node processor is configured to multiply the first row from the first sub-matrix with the first sub-vector of node values, and
a second node processor operated in parallel to the first node processor is configured to obtain, from the third memory, a second corresponding set of weights corresponding to a second row of the first sub-matrix and multiply the second row with the first sub-vector of node values.

5. The system of claim 3, wherein the each node processor is configured, at a second cycle subsequent to the first cycle, to:
read a second sub-vector of node values from the first memory;
obtain a second corresponding set of weights corresponding to a first row of a second sub-matrix from the plurality of sub-matrices, wherein the second sub-matrix belongs to a same row of sub-matrices with the first sub-matrix;
multiply the second corresponding set of weights with the second sub-vector of node values to obtain a second multiplication result; and
add the second multiplication result to the updated accumulated output value.

6. The system of claim 3, wherein the each node processor comprises a look-up-table element configured to apply an array of non-linear activation functions to the updated accumulated output value, and
wherein the each node processor is configured, after a number of cycles equivalent to a value obtained a total length of the vector of node values divided by a length of the first sub-vector, to:
apply, via the look-up-table element, an activation function to the updated accumulated output value from a current cycle; and
write a result value from the activation function to the second memory at a memory address corresponding to a first sub-vector of nodes in the next layer.

7. The system of claim 6, wherein the each node processor is configured, after the number of cycles, to:
obtain a second corresponding set of weights corresponding to a first row in a second sub-matrix from the plurality of sub-matrices, wherein the second sub-matrix belongs to a same column of sub-matrices with the first sub-matrix;
multiply the first sub-vector of node values and the second corresponding set of weights to obtain a second multiplication result,
wherein the second multiplication result is used to accumulate a value corresponding to a second sub-vector of nodes in the next layer.

8. The system of claim 1, further comprising control logic configured to:
toggle an input and out structure of the first memory and the second memory, respectively such that the plurality of node processors are configured to:
read the second vector of node values corresponding to the next layer from the second memory; and
generate node values corresponding to another layer subsequent to the next layer,
wherein the first memory is configured to store the generated node values corresponding to the other layer subsequent to the next layer.

9. The system of claim 1, wherein the each node processor comprises a multiplier configured to apply a scaling factor to the accumulated output value when the first corresponding set of weights are pre-scaled to avoid data underflow or overflow.

10. The system of claim 1, wherein the each node processor is configured to make adjustment to a number of fractional bits of the updated accumulated output value such that the updated accumulated output value is converted to a different range prior to applying an activation function.

11. A method for high throughput deep neural network processing, the method comprising:
storing, at a first memory, a first vector of node values corresponding to a current layer of a deep neural network, wherein the first vector of node values is divided into a number of sub-vectors;
storing, at a second memory, a second vector of node values corresponding to a next layer subsequent to the current layer;
operating a plurality of node processors in parallel by:
at a first cycle:
reading, by each node processor, a first sub-vector of node values from the first memory,
obtaining a first corresponding set of weights corresponding to the current layer,
computing a multiplication of (i) the first sub-vector of node values and (ii) the first corresponding set of weights to obtain a first multiplication result, and
updating an accumulated output value from a previous cycle by adding the first multiplication result to the accumulated output value.

12. The method of claim 11, further comprising:
storing, at the first memory, the first vector of node values as a number of sub-vectors of equal lengths, and
consecutively reading, via each respective node processor, each sub-vector of node values from the first memory in consecutive cycles,
wherein the first memory and the second memory are disposed on a same circuit with the plurality of node processors such that the plurality of node processors read and write intermediate data values during deep neural network processing without accessing an external memory.

13. The method of claim 11, further comprising:
storing, at a third memory, a set of weights representing a transformation matrix from the current layer to the next layer,
wherein the transformation matrix is stored as a plurality of sub-matrices having a same size corresponding to a length of the first sub-vector in each dimension, and
wherein the first corresponding set of weights corresponds to a first row from a first sub-matrix from the plurality of sub-matrices.

14. The method of claim 13, wherein the plurality of node processors includes a number of node processors equivalent to a length of the first sub-vector, and further comprising, at the first cycle:

multiplying, by a first node processor, the first row from the first sub-matrix with the first sub-vector of node values, and
obtaining, by a second node processor operated in parallel to the first node processor, from the third memory, a second corresponding set of weights corresponding to a second row of the first sub-matrix and multiplying the second row with the first sub-vector of node values.

15. The method of claim 13, further comprising:
at a second cycle subsequent to the first cycle:
reading a second sub-vector of node values from the first memory;
obtaining a second corresponding set of weights corresponding to a first row of a second sub-matrix from the plurality of sub-matrices, wherein the second sub-matrix belongs to a same row of sub-matrices with the first sub-matrix;
multiplying the second corresponding set of weights with the second sub-vector of node values to obtain a second multiplication result; and
adding the second multiplication result to the updated accumulated output value.

16. The method of claim 13, further comprising:
after a number of cycles equivalent to a value obtained a total length of the vector of node values divided by a length of the first sub-vector:
applying, via a look-up-table element configured to apply an activation function from the array of non-linear activation functions to the updated accumulated output value from a current cycle; and
writing a result value from the activation function to the second memory at a memory address corresponding to a first sub-vector of nodes in the next layer.

17. The method of claim 16, further comprising:
after the number of cycles:
obtaining a second corresponding set of weights corresponding to a first row in a second sub-matrix from the plurality of sub-matrices, wherein the second sub-matrix belongs to a same column of sub-matrices with the first sub-matrix;
multiplying the first sub-vector of node values and the second corresponding set of weights to obtain a second multiplication result,
wherein the second multiplication result is used to accumulate a value corresponding to a second sub-vector of nodes in the next layer.

18. The method of claim 11, further comprising:
toggling, via control logic contained in each node processor, an input and out structure of the first memory and the second memory, respectively such that the plurality of node processors are configured to:
read the second vector of node values corresponding to the next layer from the second memory; and
generate node values corresponding to another layer subsequent to the next layer,
wherein the first memory is configured to store the generated node values corresponding to the other layer subsequent to the next layer.

19. The method of claim 11, further comprising:
applying, via a multiplier at each node processor, a scaling factor to the accumulated output value when the first corresponding set of weights are pre-scaled to avoid data underflow or overflow.

20. The method of claim 11, further comprising:
making adjustment to a number of fractional bits of the updated accumulated output value such that the updated accumulated output value is converted to a different range prior to applying an activation function.

* * * * *